US010415520B2

(12) United States Patent
Kato et al.

(10) Patent No.: US 10,415,520 B2
(45) Date of Patent: Sep. 17, 2019

(54) FUEL SUPPLY DEVICE

(71) Applicant: DENSO CORPORATION, Kariya, Aichi-pref. (JP)

(72) Inventors: Masaaki Kato, Kariya (JP); Hisaharu Takeuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 15/575,496

(22) PCT Filed: May 18, 2016

(86) PCT No.: PCT/JP2016/002415
§ 371 (c)(1),
(2) Date: Nov. 20, 2017

(87) PCT Pub. No.: WO2016/194318
PCT Pub. Date: Dec. 8, 2016

(65) Prior Publication Data
US 2018/0163678 A1 Jun. 14, 2018

(30) Foreign Application Priority Data

Jun. 3, 2015 (JP) ................................ 2015-113420

(51) Int. Cl.
*F02M 37/00* (2006.01)
*F02M 55/00* (2006.01)
(Continued)

(52) U.S. Cl.
CPC .... *F02M 37/0041* (2013.01); *F02M 21/0215* (2013.01); *F02M 21/0245* (2013.01);
(Continued)

(58) Field of Classification Search
CPC .... F02M 37/0041; F02M 53/02; F02M 55/04; F02M 37/043; F02M 37/0017;
(Continued)

(56) References Cited

U.S. PATENT DOCUMENTS 5,404,855 A * 4/1995 Yen .................. F02M 41/16
123/446
6,003,495 A * 12/1999 Tipton .................. F02M 55/00
123/467

(Continued)

FOREIGN PATENT DOCUMENTS

JP 2010-196687 9/2010
JP 2012-193637 10/2012

*Primary Examiner* — Joseph J Dallo
(74) *Attorney, Agent, or Firm* — Nixon & Vanderhye PC (57) ABSTRACT

A fuel supply device supplying a fuel stored in a fuel tank to an engine includes a low-pressure pump configured to feed the fuel, a high-pressure pump configured to compress the fuel discharged from the low-pressure pump and to feed to the engine, a first low-pressure passage member configured to define a first fuel passage from the low-pressure pump to the high-pressure pump, and a second low-pressure passage member configured to define a second fuel passage branched from the first fuel passage at a low-pressure junction portion and joining the first fuel passage at a low-pressure confluence portion, wherein the first fuel passage and the second fuel passage are different in at least one of (i) temperatures of the fuels that flow through the fuel passages and (ii) passage lengths of the fuel passages from the low-pressure junction portion to the low-pressure confluence portion.

11 Claims, 6 Drawing Sheets

(51) Int. Cl.
*F02M 21/02* (2006.01)
*F02M 31/14* (2006.01)
*F02M 37/04* (2006.01)
*F02M 37/06* (2006.01)
*F02M 37/08* (2006.01)
*F02M 53/02* (2006.01)
*F02M 55/04* (2006.01)
*F02M 37/18* (2006.01)
*F02M 55/02* (2006.01)

(52) U.S. Cl.
CPC ........ *F02M 31/14* (2013.01); *F02M 37/0017* (2013.01); *F02M 37/0047* (2013.01); *F02M 37/0052* (2013.01); *F02M 37/043* (2013.01); *F02M 37/06* (2013.01); *F02M 37/08* (2013.01); *F02M 37/18* (2013.01); *F02M 53/02* (2013.01); *F02M 55/00* (2013.01); *F02M 55/04* (2013.01); *F02M 55/025* (2013.01); *F02M 2200/02* (2013.01); *F02M 2200/31* (2013.01); *F02M 2200/315* (2013.01); *F02M 2200/953* (2013.01); *Y02T 10/126* (2013.01); *Y02T 10/32* (2013.01)

(58) Field of Classification Search
CPC ............... F02M 21/0245; F02M 31/14; F02M 21/0215; F02M 37/06; F02M 37/0052; F02M 37/08; F02M 37/00; F02M 55/00; F02M 2200/953; F02M 2200/02; F02M 2200/31; F02M 2200/315; F02M 55/025; Y02T 10/32; Y02T 10/126
See application file for complete search history.

(56) References Cited

U.S. PATENT DOCUMENTS

| | | | | |
|---|---|---|---|---|
| 6,021,759 | A * | 2/2000 | Okajima | F02M 37/0041 123/467 |
| 6,079,450 | A * | 6/2000 | Onishi | F02M 55/04 138/26 |
| 6,293,296 | B1 * | 9/2001 | Konishi | F02M 37/0052 123/514 |
| 6,298,827 | B1 * | 10/2001 | Desai | F02M 57/025 123/446 |
| 2001/0054412 | A1 * | 12/2001 | Kojima | F02M 37/0029 123/456 |
| 2005/0072405 | A1 * | 4/2005 | Kojima | F02D 33/003 123/446 |
| 2006/0220446 | A1 * | 10/2006 | Jensen | F02M 55/005 303/3 |
| 2009/0235901 | A1 * | 9/2009 | Akita | F02M 55/04 123/506 |
| 2011/0103985 | A1 * | 5/2011 | Mancini | F02M 55/04 417/540 |
| 2011/0197850 | A1 * | 8/2011 | Kawano | F02M 25/0836 123/294 |
| 2013/0047587 | A1 * | 2/2013 | Maus | F01N 3/2066 60/295 |
| 2014/0102414 | A1 | 4/2014 | Kato | |
| 2014/0165957 | A1 * | 6/2014 | Kwun | F02M 59/44 123/196 R |
| 2015/0361935 | A1 * | 12/2015 | Nakaoka | F02M 37/0023 417/437 |
| 2016/0003199 | A1 | 1/2016 | Kato | |
| 2016/0245205 | A1 * | 8/2016 | Lavoisier | F02D 41/042 |
| 2017/0307065 | A1 * | 10/2017 | Buchmann | F16H 61/0031 |
| 2018/0372014 | A1 * | 12/2018 | Laviola | F02D 41/0087 |

* cited by examiner

FUEL SUPPLY DEVICE

CROSS REFERENCE TO RELATED APPLICATION

This application is the U.S. national phase of International Application No. PCT/JP2016/002415 filed on May 18, 2016 which designated the U.S. and claims priority to Japanese Patent Application No. 2015-113420 filed on Jun. 3, 2015, the entire contents of each of which are incorporated herein by reference.

TECHNICAL FIELD

The present disclosure relates to a fuel supply device that supplies a fuel stored in a fuel tank to an engine.

BACKGROUND ART

A fuel supply device that supplies a fuel to an engine includes a low-pressure pump feeding the fuel of a fuel tank and a high-pressure pump compressing the fuel discharged from the low-pressure pump and feeding the fuel to the engine. According to Patent Literature 1, in the above configuration, a pressure pulse is generated by the high-pressure pump that is a generation source of the pressure pulse.

In a configuration according to Patent Literature 1, a passage enlarging pipe having a flow passage area larger than that of a fuel gallery of the high-pressure pump is interposed between the fuel gallery and a fuel passage from the low-pressure pump and the high-pressure pump so as to suppress the pressure pulse. In addition, the fuel gallery has an end that is opposite to the passage enlarging pipe and is provided with an overflow valve. In the above configuration, a phase reversal reflection wave that is reflected at a boundary portion between the fuel gallery and the passage enlarging pipe and a phase reflection wave that is reflected at a boundary portion between the fuel gallery and the overflow valve are combined. Thus, the pressure pulse in the fuel gallery is reduced.

PRIOR ART LITERATURES

Patent Literature

Patent Literature 1: JP2014-77404A

SUMMARY OF INVENTION

In the configuration where the passage enlarging pipe is provided according to Patent Literature 1, the pressure pulse generated in the fuel gallery can be reduced. However, the pressure pulse can pass the passage enlarging pipe and transmit to other components of a fuel system through the fuel passage connected with the high-pressure pump. Thus, it is necessary to provide a configuration that suppresses a peak pressure of the pressure pulse and the pressure pulse transmitted from the high-pressure pump to other components so as to reduce a deterioration generated due to the pressure pulse.

It is an object of the present disclosure to provide a fuel supply device which can suppress a peak pressure of a pressure pulse transmitted from a high-pressure pump toward other components.

According to a first aspect of the present disclosure, the fuel supply device that supplies a fuel stored in a fuel tank to an engine includes a low-pressure pump configured to feed the fuel of the fuel tank, a high-pressure pump configured to compress the fuel discharged from the low-pressure pump and to feed to the engine, a first low-pressure passage member configured to define a first fuel passage from the low-pressure pump to the high-pressure pump, and a second low-pressure passage member configured to define a second fuel passage that is branched from the first fuel passage at a low-pressure junction portion and joins the first fuel passage at a low-pressure confluence portion, wherein the first fuel passage and the second fuel passage are different in at least one of (i) temperatures of the fuels that flow through the first fuel passage and the second fuel passage and (ii) passage lengths of the first fuel passage and the second fuel passage from the low-pressure junction portion to the low-pressure confluence portion.

According to the present disclosure, since the second fuel passage is branched from the first fuel passage from the low-pressure pump to the high-pressure pump, the pressure pulse generated by the high-pressure pump is divided into a component transmitting through the first fuel passage and a component transmitting through the second fuel passage. A difference between the first fuel passage and the second fuel passage in at least one of (i) the temperatures of the fuels flowing through the first fuel passage and the second fuel passage and (ii) the passage lengths of the first fuel passage and the second fuel passage from the low-pressure junction portion to the low-pressure confluence portion is provided. Thus, a phase difference is generated between the component transmitting through the second fuel passage and the component transmitting through the first fuel passage, at the low-pressure confluence portion. When the components transmitting through the above fuel passages are combined into one pressure pulse, the peak pressure of the pressure pulse is reduced comparing to the peak pressure in a case where the pressure pulse transmits only through the first fuel passage. Thus, the peak pressure of the pressure pulse can be reduced by a high practicability configuration where two fuel passages are provided.

According to a second aspect of the present disclosure, the fuel supply device that supplies a fuel stored in a fuel tank to an engine includes a high-pressure pump configured to compress the fuel fed from the fuel tank by a low-pressure pump, a first return passage member configured to define a first return passage that returns the fuel from the high-pressure pump toward the fuel tank, and a second return passage member configured to define a second return passage that is branched from the first return passage at a return junction portion and joins the first return passage at a return confluence portion, wherein the first return passage and the second return passage are different in at least one of (i) temperatures of the fuels that flow through the first return passage and the second return passage and (ii) passage lengths of the first return passage and the second return passage from the return junction portion to the return confluence portion.

According to the present disclosure, since the second return passage is branched form the first return passage that returns the fuel from the high-pressure pump to the fuel tank, the pressure pulse generated by the high-pressure pump is divided into a component transmitting through the first return passage and a component transmitting through the second return passage. A difference between the first return passage and the second return passage in at least one of (i) the temperatures of the fuels flowing through the first return passage and the second return passage and (ii) the passage lengths of the first return passage and the second return passage from the return junction portion to the return confluence portion is provided. Thus, a phase difference is generated between the component transmitting through the second return passage and the component transmitting through the first return passage, at the return confluence portion. When the components transmitting through the above return passages are combined into one pressure pulse, the peak pressure of the pressure pulse is reduced comparing to the peak pressure in a case where the pressure pulse transmits only through the first return passage. Thus, the peak pressure of the pressure pulse can be reduced by a high practicability configuration where two return passages are provided.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereafter, referring to drawings, embodiments of the present disclosure will be described. The substantially same parts or components as those in the embodiments are indicated with the same reference numerals and the same descriptions may be omitted. When only a part of a configuration in each embodiment is described, the other parts of the configuration can be configured as the same as a prior embodiment. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

First Embodiment

Figure 1:
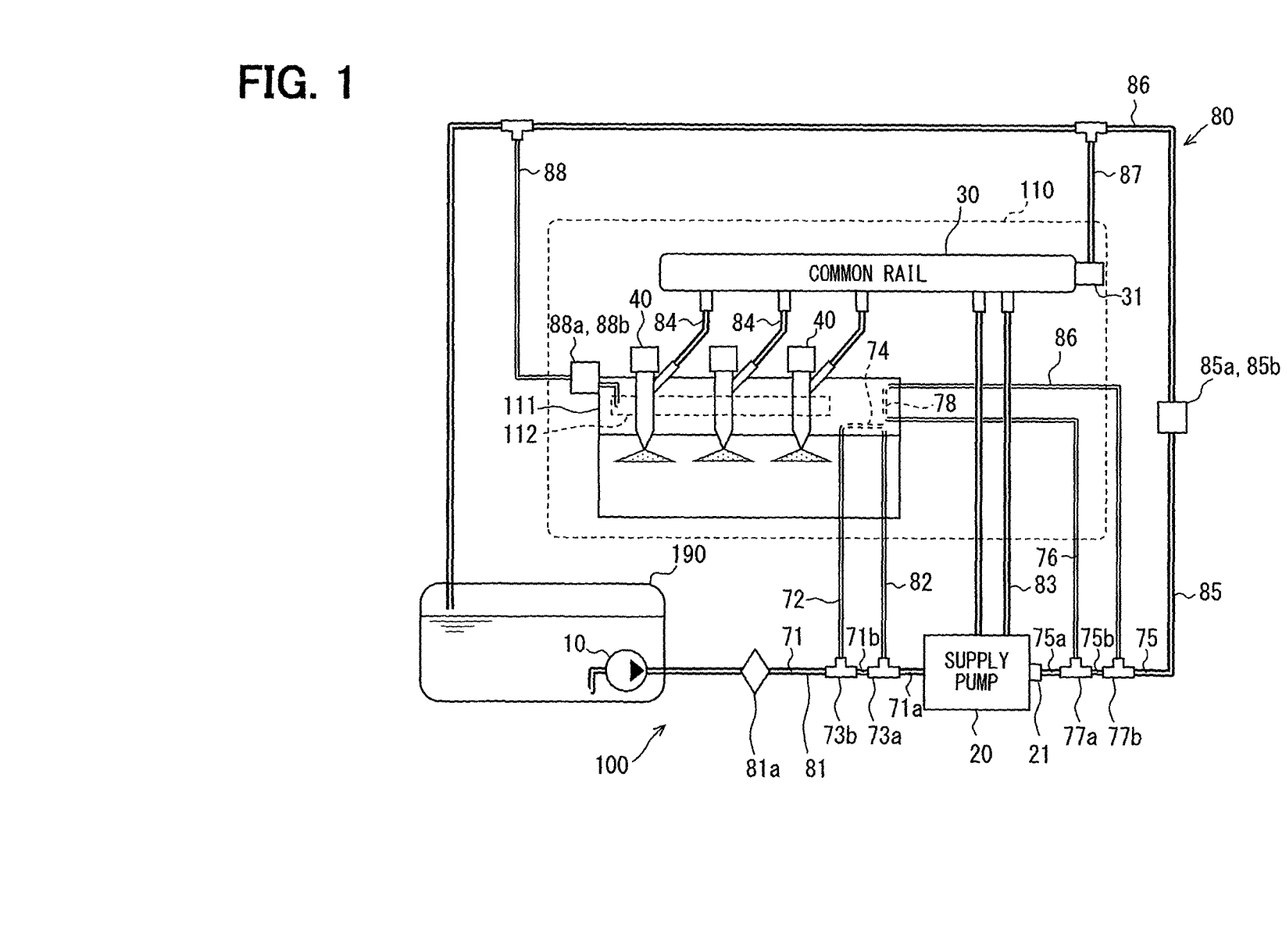
FIG. 1 is a diagram showing an outline of a fuel supply device according to a first embodiment of the present disclosure.

According to a first embodiment of the present disclosure, as shown in FIG. 1, a fuel supply device 100, a fuel tank 190 and the an internal combustion engine 110 are mounted to a vehicle. The fuel supply device 100 supplies a liquefied gas fuel stored in the fuel tank 190 to the internal combustion engine 110. A part of the liquefied gas fuel supplied to the internal combustion engine 110 is returned to the fuel tank 190.

The fuel tank 190 stores a dimethyl ether (DME) that is one type of the liquefied gas fuel. A DME fuel in the fuel tank 190 is compressed by a pressure in response to a fuel vapor pressure to be liquefied. The fuel tank 190 includes a safety valve. When a pressure in the fuel tank 190 exceeds an upper limit pressure that is predetermined, the safety valve opens. According to the present disclosure, the DME fuel may be referred to as a fuel.

The internal combustion engine 110 is located in an engine room of the vehicle. The internal combustion engine 110 is a diesel engine. In the internal combustion engine 110, the DME fuel injected by an injector 40 arranged in each cylinder is compressed in the cylinder. The internal combustion engine 110 converts a heat energy of the DME fuel combusting by a compression in each combustion chamber into a power. The internal combustion engine 110 includes a common rail 30 in addition of the injector 40.

The injector 40 supplies the DME fuel to each cylinder of the internal combustion engine 110. The injector 40 has an injection port exposed to the combustion chamber when the injector 40 is inserted into a through hole in a cylinder head 111 of the internal combustion engine 110. The injector 40 injects the DME fuel from the injection port exposed to the combustion chamber based on a control signal that is inputted to the injector 40.

The common rail 30 is a member that is made of a metal material such as a ferrous material and is a tubular shape. The common rail 30 stores the DME fuel supplied by the fuel supply device 100 and maintains the pressure of the DME fuel. The common rail 30 supplies the DME fuel to each injector 40. The common rail 30 includes a regulating valve 31. When a fuel pressure that is a pressure of the DME fuel in the common rail 30 exceeds an upper limit pressure that is predetermined, the regulating valve 31 opens.

The fuel supply device 100 includes a fuel line 80, a feed pump 10 and a supply pump 20. The fuel line 80 includes fuel passages through which the DME fuel flows between the fuel tank 190 and the internal combustion engine 110. The fuel line 80 includes a main low-pressure pipe 81, a high-pressure pipe 83, a distribution pipe 84, a main return pipe 85, a rail return pipe 87 and an injector return pipe 88. The above pipes are constituted by hose members that are made of a rubber reinforced by a polyester or an aramid and tubular members that are made of a metal material and are bent.

The main low-pressure pipe 81 is connected with the feed pump 10 and the supply pump 20. The main low-pressure pipe 81 defines a first fuel passage 71 through which the DME fuel stored in the fuel tank 190 flows from the feed pump 10 to the supply pump 20. The main low-pressure pipe 81 includes a fuel filter 81a. The fuel filter 81a can remove a foreign matter from the DME fuel flowing through the first fuel passage 71.

The high-pressure pipe 83 is connected with the supply pump 20 and the common rail 30. The high-pressure pipe 83 defines a high-pressure fuel passage through which the DME fuel having a high pressure and discharged by the supply pump 20 flows from the supply pump 20 to the common rail 30. The distribution pipe 84 is connected with the common rail 30 and each injector 40. The distribution pipe 84 defines a distribution passage through which the DME fuel having the high pressure and stored in the common rail 30 flows from the common rail 30 to the injector 40.

The main return pipe 85 is connected with a leakage fuel discharging portion 21 of the supply pump 20 and the fuel tank 190. The main return pipe 85 defines a first return passage 75 through which a leakage fuel discharged from the leakage fuel discharging portion 21 flows from the leakage fuel discharging portion 21 to the fuel tank 190. The main return pipe 85 includes an overflow valve 85a and a thermostat 85b.

When the pressure of the fuel discharged from the leakage fuel discharging portion 21 exceeds a threshold pressure that is predetermined, the overflow valve 85a opens. According to the present embodiment, the threshold pressure is 3 MPa. The overflow valve 85a and the thermostat 85b are arranged in a parallel connection. When a temperature of the fuel discharged from the leakage fuel discharging portion 21 exceeds a threshold temperature that is predetermined, the thermostat 85b opens. According to the present embodiment, the threshold temperature is 90 degrees Celsius. The overflow valve 85a and the thermostat 85b open to allow a flowing of the DME fuel that returns from the supply pump 20 to the fuel tank 190.

The rail return pipe 87 is connected with the regulating valve 31 of the common rail 30 and the main return pipe 85. The rail return pipe 87 defines a rail return passage through which a surplus fuel discharged from the common rail 30 flows into the first return passage 75. The surplus fuel of the common rail 30 is returned to the fuel tank 190 together with the leakage fuel through the rail return passage and the first return passage 75.

The injector return pipe 88 is connected with a fuel gallery 112 of the cylinder head 111 and the main return pipe 85. The fuel gallery 112 extends in the cylinder head 111 in an axial direction of a crank shaft. The leakage fuel is discharged from each injector 40 to the fuel gallery 112. The injector return pipe 88 defines an injector return passage through which the leakage fuel discharged by the fuel gallery 112 flows into the first return passage 75. As the above description, the surplus fuel joins the leakage fuel in the first return passage 75 through the rail return passage, and the leakage fuel joins the surplus fuel in the first return passage 75 through the injector return passage. The injector return pipe 88 includes a back pressure valve 88a and a thermostat 88b.

When the pressure of the fuel in the fuel gallery 112 exceeds the threshold pressure that is predetermined, the back pressure valve 88a opens. The back pressure valve 88a and the thermostat 88b are arranged in a parallel connection. When the temperature of the fuel of the fuel gallery 112 exceeds the threshold temperature that is predetermined, the thermostat 88b opens. The back pressure valve 88a and the thermostat 88b open to allow a flowing of the DME fuel that returns from the fuel gallery 112 to the fuel tank 190.

The feed pump 10 is an electric pump located in the fuel tank 190. The feed pump 10 suctions the DME fuel stored in the fuel tank 190 by using a power of an electric motor. The feed pump 10 compresses the DME fuel by adding a feed pressure, and then feeds the DME fuel toward the supply pump 20 through the first fuel passage 71. According to the present embodiment, the feed pressure is around 3 MPa.

The supply pump 20 that is a plunger pump is driven by the internal combustion engine 110. The supply pump 20 suctions the DME fuel discharged from the feed pump 10 into a compression chamber 23. The supply pump 20 compresses the DME fuel of the compression chamber 23 by a plunger 22 that reciprocates according to the power of the internal combustion engine 110. Thus, the DME fuel that is compressed is fed from the supply pump 20 toward the common rail 30.

The supply pump 20 includes the leakage fuel discharging portion 21. The leakage fuel discharging portion 21 discharges the leakage fuel generated at the supply pump 20 to the first return passage 75. The leakage fuel is the fuel that is leaked through a clearance around a slidable portion including the plunger 22.

Figure 2:
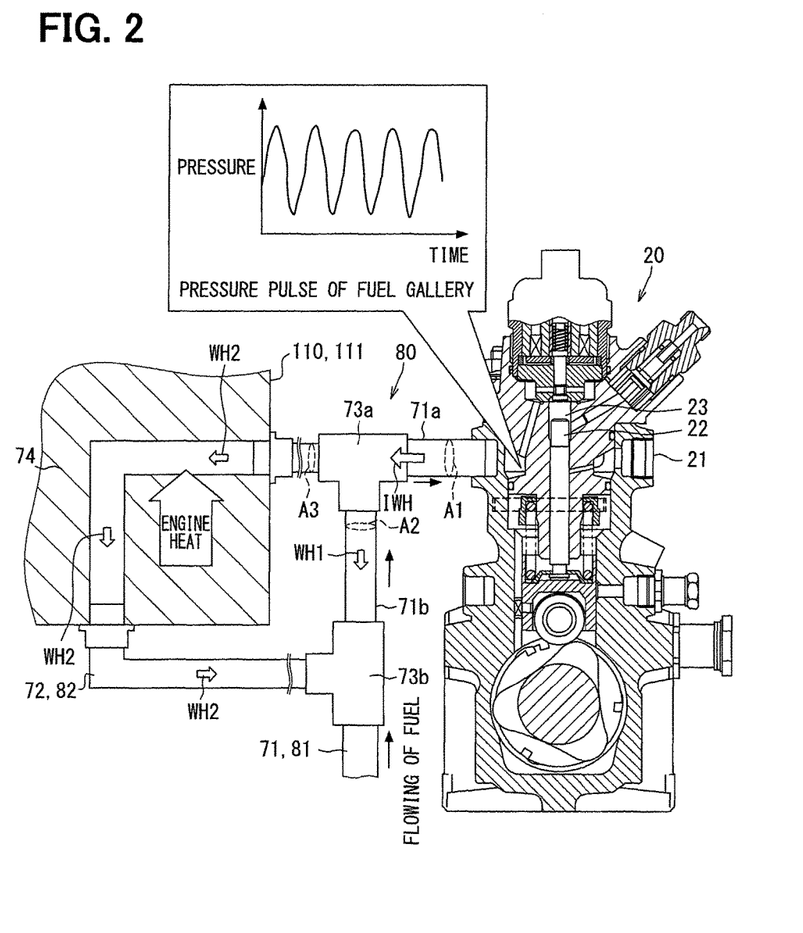
FIG. 2 is a diagram showing specifications of a supply pump and low-pressure pipes.

As shown in FIG. 2, the supply pump 20 generates a pressure pulse in a fuel gallery by an operation that suctions the fuel into the compression chamber 23 and discharges the fuel from the compression chamber 23. The pressure pulse that is generated by the supply pump 20 that is a generation source of the pressure pulse transmits to other components of the fuel line 80 as a pressure water hammer. As shown in FIGS. 1 and 2, the fuel line 80 further includes a sub low-pressure pipe 82 and a sub return pipe 86 that suppress an effect of the pressure water hammer.

The sub low-pressure pipe 82 is connected with the main low-pressure pipe 81 and the cylinder head 111 between the supply pump 20 and the fuel filter 81a. The sub low-pressure pipe 82 extends in a direction substantially intersecting the main low-pressure pipe 81 at right angles. The sub low-pressure pipe 82 defines a second fuel passage 72 between the main low-pressure pipe 81 and the cylinder head 111. The sub low-pressure pipe 82 has ends that are connected with the first fuel passage 71 by two joint members. Between the two join members, one joint member that is closer to the supply pump 20 constitutes a low-pressure junction portion 73a and the other one joint member that is closer to the feed pump 10 constitutes a low-pressure confluence portion 73b.

The second fuel passage 72 is branched from the first fuel passage 71 at the low-pressure junction portion 73a. The second fuel passage 72 defines a passage through which the DME fuel flows in a direction parallel to the first fuel passage 71, and joins the first fuel passage 71 at the low-pressure confluence portion 73b. A passage length that is a length of the second fuel passage 72 from the low-pressure junction portion 73a to the low-pressure confluence portion 73b is different from a passage length that is a length of the first fuel passage 71 from the low-pressure junction portion 73a to the low-pressure confluence portion 73b. Specifically, the passage length of the second fuel passage 72 is longer than the passage length of the first fuel passage 71 by a value that is around 1 m.

The temperature of the fuel flowing through the second fuel passage 72 is different from the temperature of the fuel flowing through the first fuel passage 71. The sub low-pressure pipe 82 includes a low-pressure temperature increasing portion 74 that increases the temperature of the DME fuel flowing through the second fuel passage 72. The low-pressure temperature increasing portion 74 is located in the cylinder head 111. The low-pressure temperature increasing portion 74 is a part of the second fuel passage 72 that is located in the cylinder head 111. The low-pressure temperature increasing portion 74 heats the DME fuel flowing through the second fuel passage 72 in the cylinder head 111 by the heat generated at the internal combustion engine 110. The low-pressure temperature increasing portion 74 can maintain the DME fuel at a high temperature by transmitting a heat of at least one of a coolant of the internal combustion engine 110 and a lubricating oil of the internal combustion engine 110 to the DME fuel flowing through the second fuel passage 72.

Figure 3:
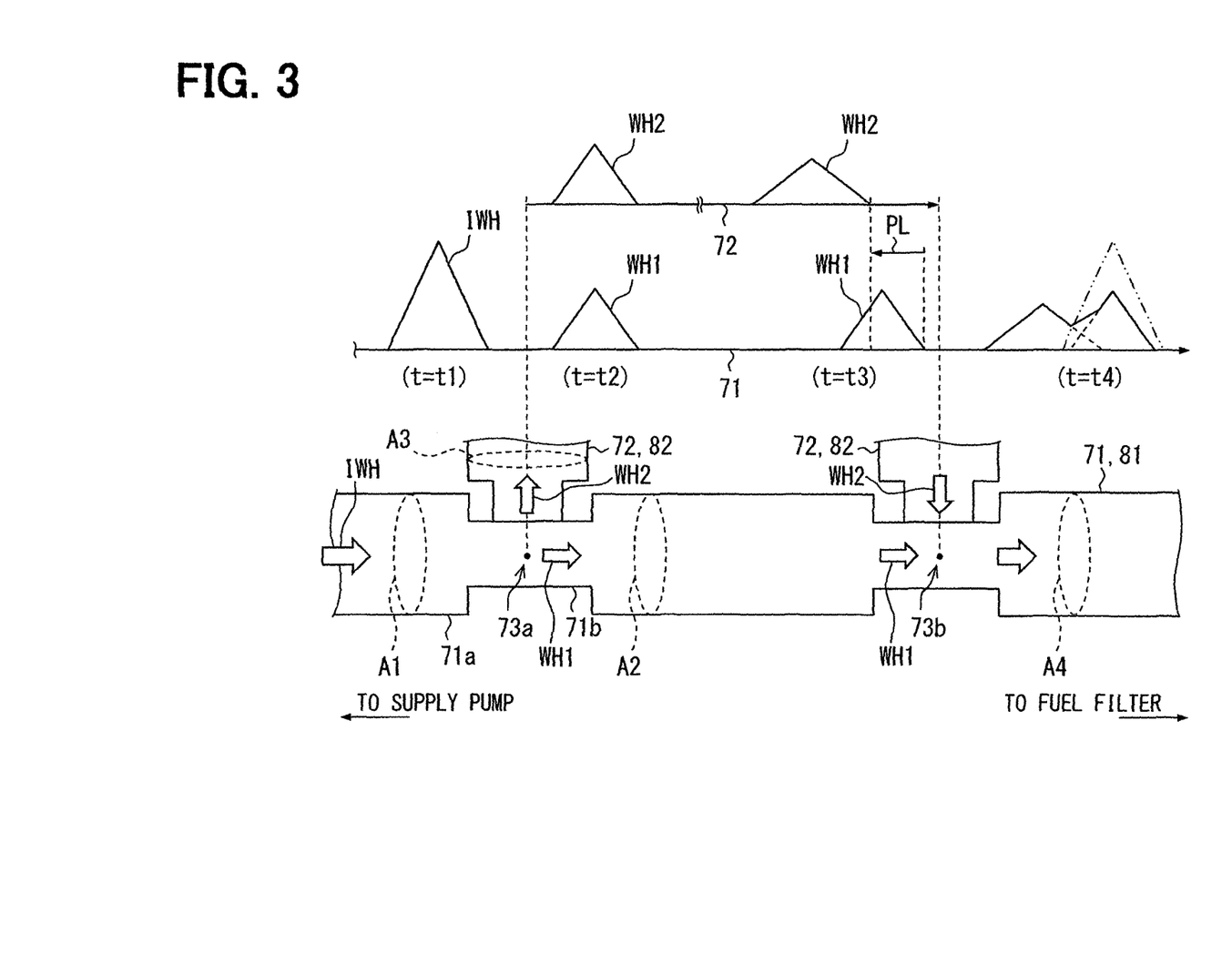
FIG. 3 is a diagram showing a decreasing of a peak pressure generated by a sub low-pressure pipe.

A branching of the low-pressure junction portion 73a enlarges a flow passage area. Specifically, a region of the first fuel passage 71 interposed between the supply pump 20 and the low-pressure junction portion 73a is referred to as a pre-branching region 71a, and a region of the first fuel passage 71 interposed between the low-pressure junction portion 73a and the low-pressure confluence portion 73b is referred to as a post-branching region 71b. As shown in FIG. 3, a flow passage area A1 in the pre-branching region 71a is set to be smaller than a flow passage area that is a sum of a flow passage area A2 in the post-branching region 71b and a flow passage area A3 of the second fuel passage 72 branched at the low-pressure junction portion 73a. In addition, the post-branching region 71b and the second fuel passage 72 enlarge the flow passage areas. Thus, the flow passage area A2 in the post-branching region 71b and the flow passage area A3 of the second fuel passage 72 are substantially identical with or larger than the flow passage area A1 in the pre-branching region 71a. Further, a flow passage area A4 in the first fuel passage 71 after the second fuel passage 72 joins the first fuel passage 71 is larger than a flow passage area of the low-pressure confluence portion 73b, and is substantially identical with the flow passage area A1 of the pre-branching region 71a.

The sub return pipe 86 is connected with the main return pipe 85 and the cylinder head 111 between the supply pump 20 and the overflow valve 85a. The sub return pipe 86 extends in a direction substantially intersecting the main return pipe 85 at right angles. The sub return pipe 86 defines a second return passage 76 between the main return pipe 85 and the cylinder head 111. The sub return pipe 86 has ends that are connected with the main return pipe 85 by two joint members. Between the two joint members, one joint member that is closer to the supply pump 20 constitutes a return junction portion 77a and the other one joint member that is farther from the supply pump 20 constitutes a return confluence portion 77b.

The second return passage 76 is branched from the first return passage 75 at the return junction portion 77a. The second return passage 76 defines a passage through which the return fuel flows in a direction parallel to the first return passage 75, and joins the first return passage 75 at the return confluence portion 77b. A passage length that is a length of the second return passage 76 from the return junction portion 77a to the return confluence portion 77b is different from a passage length that is a length of the first return passage 75 from the return junction portion 77a to the return confluence portion 77b.

The temperature of the fuel flowing through the second return passage 76 is different from the temperature of the fuel flowing through the first return passage 75. The sub return pipe 86 includes a return temperature increasing portion 78 that increases the temperature of the DME fuel flowing through the second return passage 76. The return temperature increasing portion 78 is located in the cylinder head 111 as the same as the low-pressure temperature increasing portion 74. The return temperature increasing portion 78 is a part of the second return passage 76 that is located in the cylinder head 111. The return temperature increasing portion 78 heats the DME fuel flowing through the second return passage 76 in the cylinder head 111 by the heat generated at the internal combustion engine 110. The return temperature increasing portion 78 can maintain the DME fuel at a high temperature by transmitting the heat of at least one of the coolant of the internal combustion engine 110 and the lubricating oil of the internal combustion engine 110 to the DME fuel flowing through the second return passage 76.

A branching of the return junction portion 77a enlarges the flow passage area. Specifically, a region of the first return passage 75 interposed between the supply pump 20 and the return junction portion 77a is referred to as a pre-branching region 75a, and a region of the first return passage 75 interposed between the return junction portion 77a and the return confluence portion 77b is referred to as a post-branching region 75b. The flow passage area in the pre-branching region 75a is set to be smaller than a flow passage area that is a sum of the flow passage area in the post-branching region 75b and the flow passage area of the second return passage 76 branched at the return junction portion 77a.

A principle that the peak pressure of the pressure water hammer is reduced will be described according to the above configurations.

When an inflow of the fuel to the compression chamber 23 is shut off at the supply pump 20, the pressure water hammer (intake water hammer) IWH shown in FIGS. 2 and 3 transmits from the fuel gallery of the supply pump 20 to the pre-branching region 71a of the first fuel passage 71 (refer to a time point t1 shown in FIG. 3). The intake water hammer IWH is divided at the low-pressure junction portion 73a into a first water hammer component WH1 that transmits through the first fuel passage 71 and a second water hammer component WH2 that transmits through the second fuel passage 72 (refer to a time point t2 shown in FIG. 3).

An energy of the intake water hammer IWH may be divided into the first water hammer component WH1 and the second water hammer component WH2 that are substantially half of the intake water hammer IWH by a dividing at the low-pressure junction portion 73a. Thus, peak pressures of the first water hammer component WH1 and the second water hammer component WH2 are around 50% of the peak pressure of the intake water hammer IWH. In addition, a head loss is generated due to a bending of a passage at the low-pressure junction portion 73a and a change of the flow passage areas upstream and downstream of the low-pressure junction portion 73a and the low-pressure confluence portion 73b and the flow passage area in the second fuel passage 72. The head loss can reduce the water hammer components WH1 and WH2.

The water hammer components WH1 and WH2 substantially transmit at a sound velocity. The sound velocity increases in accordance with a decrease in temperature of the DME fuel and increases in accordance with an increase in pressure of the DME fuel. The sound velocity in the DME fuel flowing through the second fuel passage 72 becomes slower than the sound velocity in the DME fuel flowing through the first fuel passage 71 by a temperature increasing effect of the low-pressure temperature increasing portion 74. Thus, a propagation velocity of the second water hammer component WH2 that is a velocity of the second water hammer component WH2 that transmits becomes slower than a propagation velocity of the first water hammer component WH1 that is a velocity of the first water hammer component WH1 that transmits. The passage length of the second fuel passage 72 is longer than the passage length of the first fuel passage 71. Thus, a phase delay PL is generated in the second water hammer component WH2 relative to the first water hammer component WH1 right before the low-pressure junction portion 73a (refer to a time point t3 shown in FIG. 3).

An elastic coefficient of the DME fuel decreases in accordance with an increase in temperature of the DME fuel. Thus, the elastic coefficient of the DME fuel of the second fuel passage 72 becomes lower than the elastic coefficient of the DME fuel of the first fuel passage 71 by a heating of the fuel at the low-pressure temperature increasing portion 74. Thus, a waveform of the second water hammer component WH2 becomes gradual while the second water hammer component WH2 transmits through the second fuel passage 72, and becomes a waveform that the peak pressure is reduced.

As the above description, the sub low-pressure pipe 82 can delay an arrival of the second water hammer component WH2 relative to an arrival of the first water hammer component WH1 at the low-pressure confluence portion 73b and can reduce the peak pressure of the second water hammer component WH2. Thus, the sub low-pressure pipe 82 can reduce the peak pressure of the water hammer transmitted from the low-pressure confluence portion 73b to the feed pump 10 (refer to FIG. 1) to around a half of the peak pressure when the sub low-pressure pipe 82 is cancelled (refer to a two-dotted dashed line shown in FIG. 3).

Similarly, the pressure water hammer transmitted from the leakage fuel discharging portion 21 to the pre-branching region 75a of the first return passage 75 is divided at the return junction portion 77a into a first water hammer component that transmits through the first return passage 75 and a second water hammer component that transmits through the second return passage 76. According to differences between the first return passage 75 and the second return passage 76 in fuel temperature and passage length, a phase of the second water hammer component delays relative to a phase of the first water hammer component right before the return junction portion 77a. Further, according to a heating of the fuel at the return temperature increasing portion 78, a waveform of the second water hammer component becomes gradual while the second water hammer component transmits through the second return passage 76, and becomes a waveform that the peak pressure is reduced.

As the above description, the sub return pipe 86 can delay an arrival of the second water hammer component relative to an arrival of the first water hammer component at the return confluence portion 77b and can reduce the peak pressure of the second water hammer component. Thus, the sub return pipe 86 can reduce the peak pressure of the water hammer transmitted from the return confluence portion 77b to the overflow valve 85a to around a half of the peak pressure of when the sub return pipe 86 is cancelled.

According to the first embodiment as the above description, the first fuel passage 71 and the second fuel passage 72 have differences in fuel temperature and passage length. Thus, a phase difference is generated between the first water hammer component WH1 and the second water hammer component WH2 at the low-pressure confluence portion 73b. When the two water hammer components WH1 and WH2 combine into one water hammer, the peak pressure of the water hammer generated due to the pressure pulse is reduced comparing to the peak pressure in a case where the water hammer transmits only through the first fuel passage 71.

Similarly, the first return passage 75 and the second return passage 76 have the differences in fuel temperature and passage length. Thus, a phase difference is generated between the first water hammer component and the second water hammer component at the return confluence portion 77b. When the two water hammer components combine into one water hammer, the peak pressure of the water hammer generated due to the pressure pulse is reduced comparing to the peak pressure in a case where the water hammer transmits only through the first return passage 75.

Thus, the peak pressure of the pressure pulse can be reduced by a high practicability configuration where two fuel passages are provided. Thus, the fuel filter 81a, the overflow valve 85a and the thermostat 85b are protected from the water hammer generated due to the pressure pulse.

Figure 4:
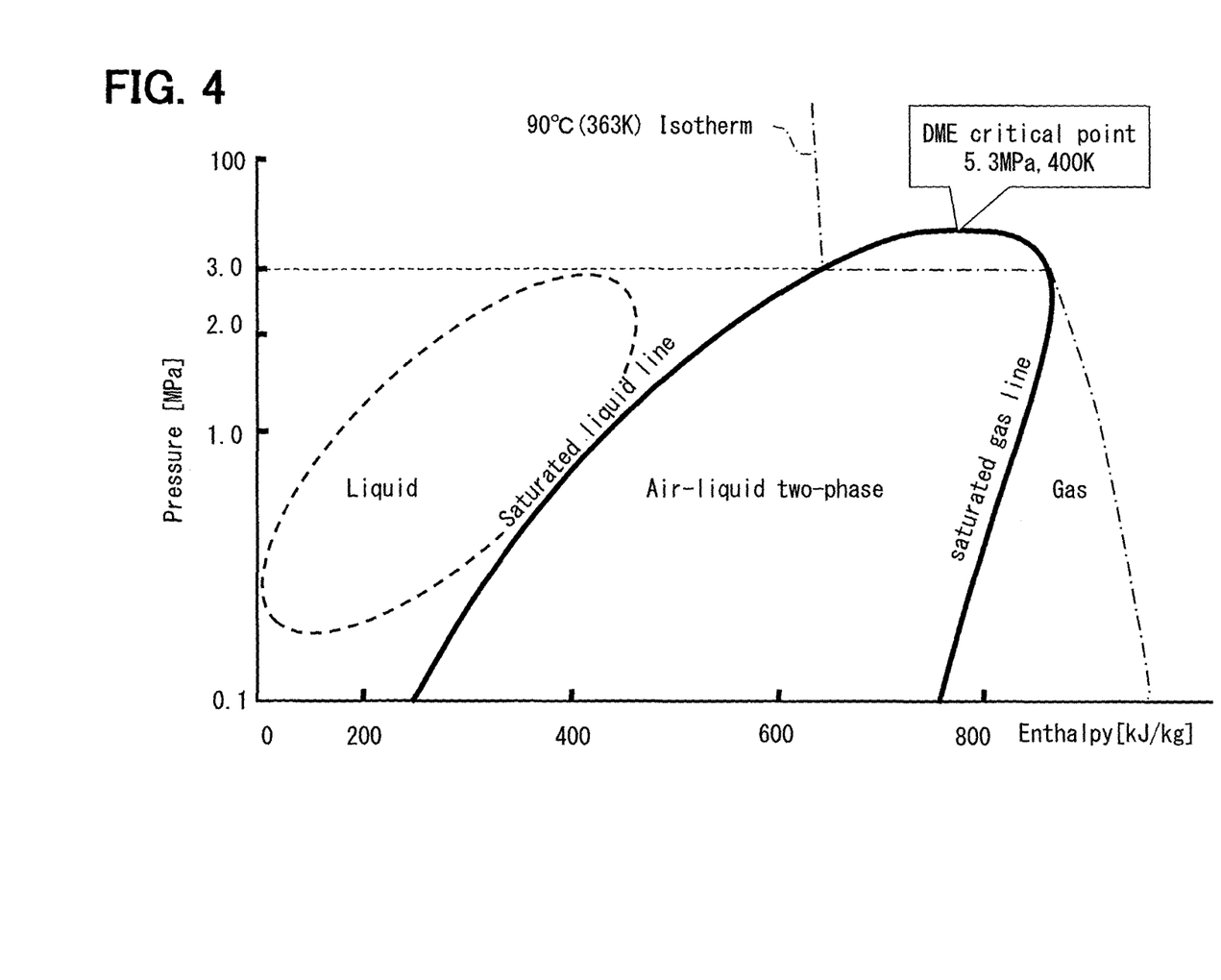
FIG. 4 is a diagram showing a Mollier chart of dimethyl ether.

According to the first embodiment, the peak pressure can be reduced while a liquid-phase state (refer to a dashed area shown in FIG. 4) of the DME fuel in the second fuel passage 72 and the second return passage 76 is maintained. As the above description, the fuel supply device can reduce the pressure pulse by using the head loss when the liquid-phase state of the DME fuel is maintained, without reducing the pressure pulse by an accumulator effect when the DME fuel is converted into an air-liquid two-phase state or a gas-phase state.

According to the first embodiment, a consumption of an energy used to increase the temperature of the fuel is suppressed and the propagation velocities of the second water hammer components transmitting through the second fuel passage 72 and the second return passage 76 are reduced, by using the heat generated at the internal combustion engine 110. Further, when the fuel temperatures in the second fuel passage 72 and the second return passage 76 are maintained to be at a high temperature, the waveforms of the second water hammer components become waveforms that the peak pressures are reduced when the second water hammer components transmit. Thus, when two groups of the two water hammer components combine at the low-pressure confluence portion 73b and the return confluence portion 77b, the peak pressure is surely reduced.

According to the first embodiment, areas of passages through which the pressure pulses transmit are enlarged by the branchings at the low-pressure junction portion 73a and the return junction portion 77a. The head losses are generated due to enlargements of the flow passage areas. Thus, the pressure pulses can be reduced, and the peak pressure can be reduced.

According to the first embodiment, in the fuel supply device 100 that supplies the DME to the internal combustion engine 110, the feed pressure of the fuel discharged from the feed pump 10 is higher than the feed pressure of when a liquefied fuel such as light oil is supplied, such that the fuel is not vaporized. Thus, in the fuel supply device 100 that supplies the DME fuel, the peak pressure generated due to the pressure pulse has a value higher than that of the peak pressure when the liquefied fuel is supplied. Thus, since a configuration where the sub low-pressure pipe 82 and the sub return pipe 86 are provided is applied to the fuel supply device 100 that supplies the DME fuel, the fuel filter 81a can be remarkably protected.

According to the first embodiment, the feed pump 10 is equivalent to a low-pressure pump, the supply pump 20 is equivalent to a high-pressure pump, the main low-pressure pipe 81 is equivalent to a first low-pressure passage member, and the sub low-pressure pipe 82 and the cylinder head 111 are equivalent to a second low-pressure passage member. Further, the main return pipe 85 is equivalent to a first return passage member, the sub return pipe 86 and the cylinder head 111 are equivalent to a second return passage member, and the internal combustion engine 110 is equivalent to an engine.

Second Embodiment

Figure 5:
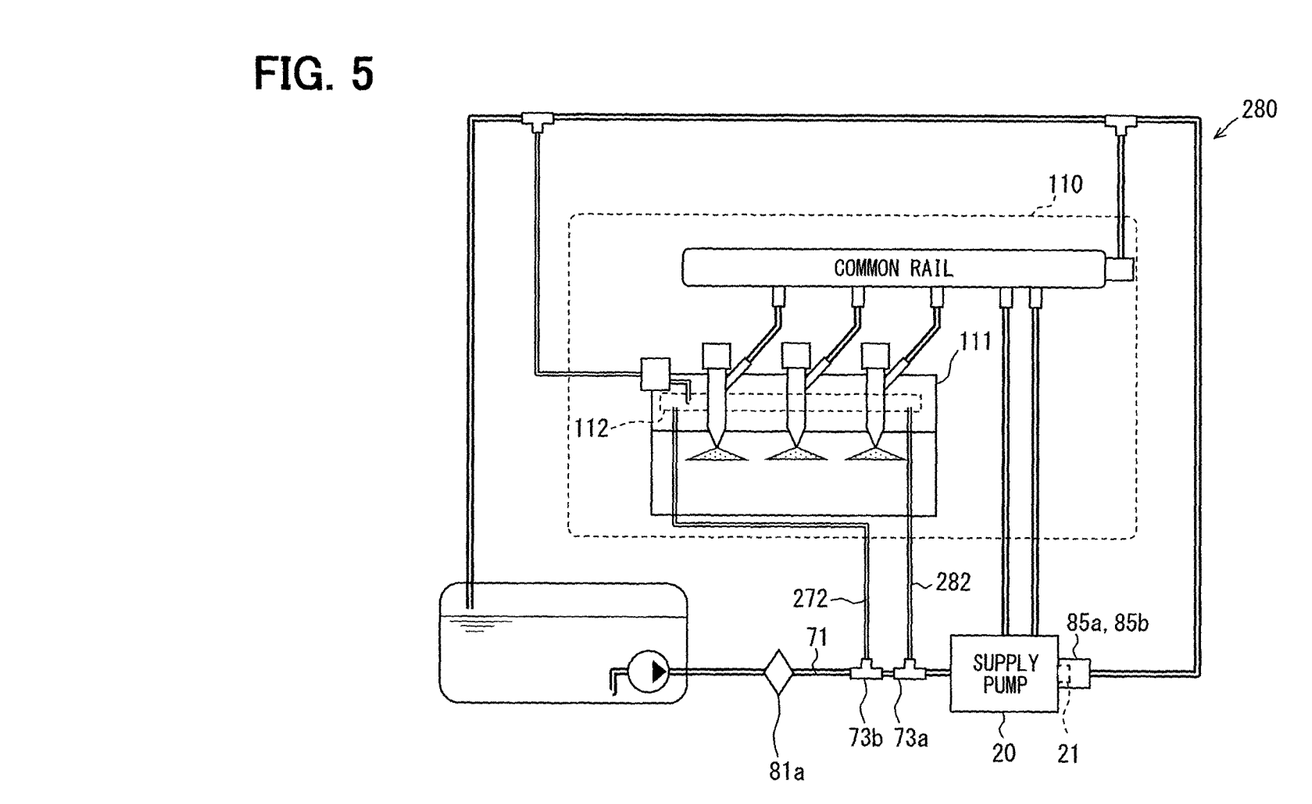
FIG. 5 is a diagram showing an outline of the fuel supply device according to a second embodiment of the present disclosure.

A second embodiment of the present disclosure as shown in FIG. 5 is a modification of the first embodiment. According to the second embodiment, a configuration equivalent to the configuration where the sub return pipe 86 of the first embodiment (refer to FIG. 1) is provided is cancelled from a fuel line 280. A sub low-pressure pipe 282 includes two pipe members. The pipe members are connected with a region of the first fuel passage 71 between the supply pump 20 and the fuel filter 81a, and are connected with two ends of the fuel gallery 112 located in the cylinder head 111, respectively. As the above configuration, the sub low-pressure pipe 282 defines a second fuel passage 272 between the first fuel passage 71 and the fuel gallery 112. At least a part of the second fuel passage 272 is constituted by the fuel gallery 112.

In the second fuel passage 272, a passage length that is a length of the second fuel passage 272 from the low-pressure junction portion 73a to the low-pressure confluence portion 73b is different from the passage length of the first fuel passage 71 and is longer than the passage length of the first fuel passage 71. The DME fuel flowing through the fuel gallery 112 in the second fuel passage 272 is heated by a heat transmitted from the coolant and the lubricating oil of the internal combustion engine 110 and a heat transmitted from the fuel chamber. Thus, the DME fuel of the second fuel passage 272 is maintained to be at a high temperature higher than the DME fuel of the first fuel passage 71.

According to the second embodiment as the above description, since effects the same as the first embodiment are obtained, the peak pressure of the pressure pulse can be reduced. According to the second embodiment, an implementability of a configuration where the second fuel passage 272 is provided is improved by using an existing configuration where the fuel gallery 112 is provided. When a configuration where the DME fuel flows through the fuel gallery 112 is used, a temperature increasing of the fuel can be surely executed by an engine heat of the internal combustion engine 110. Since the fuel gallery 112 has a complicated passage shape, the second water hammer component passed the fuel gallery 112 can be surely reduced. Thus, an effect of reducing the peak pressure of the pressure pulse can be further improved. According to the second embodiment, the sub low-pressure pipe 282 is equivalent to the second low-pressure passage member.

Other Embodiment

The present disclosure is described according to the above embodiments. However, the present disclosure is not limited to the embodiment mentioned above, and can be applied to various embodiments within the spirit and scope of the present disclosure.

Figure 6:
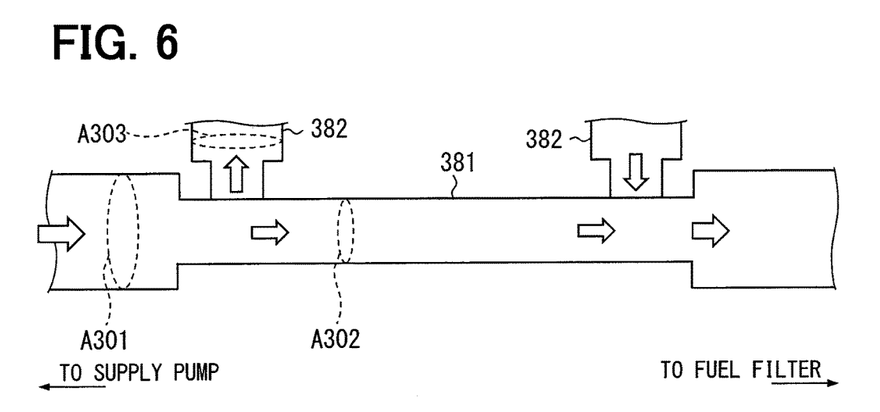
FIG. 6 is a diagram showing a modification of a main low-pressure pipe and the sub low-pressure pipe.

According to the first embodiment, the flow passage areas A2 and A3 after the intake water hammer is divided are at the same level as the flow passage area A1 before the intake water hammer is divided. As the above configuration, since the intake water hammer is throttled at the low-pressure junction portion 73a and the water hammer components are enlarged after the intake water hammer is divided and the water hammer components are throttled at the low-pressure confluence portion 73b and the intake water hammer is enlarged after the water hammer components are joined together, the effect of reducing the peak pressure of the pressure pulse is remarkably improved. However, the flow passage areas of the main low-pressure pipe and the sub low-pressure pipe after the intake water hammer is divided may be sufficiently larger than the flow passage area of the main low-pressure pipe before the intake water hammer is divided. Alternatively, as shown in FIG. 6 according to a modification, in a main low-pressure pipe 381 and a sub low-pressure pipe 382, flow passage areas A302 and A303 after the intake water hammer is divided are smaller than a flow passage area A301 before the intake water hammer is divided, the pressure pulse can still be reduced.

According to the first embodiment, sub pipes are provided relative to the main low-pressure pipe and the main return pipe. According to the second embodiment, a sub pipe is only provided relative to the main low-pressure pipe between the main low-pressure pipe and the main return pipe. However, a sub pipe may be only provided relative to the main return pipe between the main low-pressure pipe and the main return pipe. Alternatively, a sub pipe may be provided relative to the high-pressure pipe. As shown in FIG. 5, in an embodiment where a sub pipe is not provided relative to the main return pipe, the overflow valve 85a and the thermostat 85b can be directly mounted to the leakage fuel discharging portion 21 of the supply pump 20.

According to the above embodiments, the differences between the first fuel passage and the second fuel passage in fuel temperature and passage length are used. However, pipe lengths of the main low-pressure pipe and the sub low-pressure pipe may be substantially even, and only temperatures of the DME fuels flowing through the main low-pressure pipe and the sub low-pressure pipe may be different from each other. Alternatively, a configuration where the pipe lengths of the main low-pressure pipe and the sub low-pressure pipe are different from each other may be used without using a configuration where a difference between the main low-pressure pipe and the sub low-pressure pipe in fuel temperature is generated.

When a frequency of the pressure pulse is 120 Hz, a period is 8 ms. When the sound velocity is 500 m/s, it is necessary that the difference in passage length (pipe length) is around 2 m so as to generate a phase delay that is 4 ms and is a half-wave length. When the feed pressure of the feed pump 10 is 3 MPa and the difference between the first fuel passage and the second fuel passage in fuel temperature is 40 degrees Celsius, the phase delay that is 4 ms and is the half-wave wave length is generated in a case where the difference in passage length is around 1 m.

According to the above embodiments, the DME fuel in the second fuel passage and the second return passage are heated by the engine heat of the internal combustion engine 110. However, an electric heating device such as a heater may be used as a low-pressure temperature increasing portion or a return temperature increasing portion. In an embodiment where the fuel gallery is used as a part of the second fuel passage similar to the second embodiment, a tube that has a high thermal conductivity and is made of copper may be located between an outer peripheral surface of the injector and an inner peripheral surface of the through hole of the cylinder head. The tube that is made of copper can effectively transmit a combustion heat to the DME fuel in the fuel gallery 112 and can support the temperature increasing of the DME fuel.

According to the above embodiments, a temperature increasing configuration where the temperature of the second fuel passage is increased is used to generate the difference between the DME fuel in the first fuel passage and the DME fuel in the second fuel passage in fuel temperature. However, the difference of the DME fuel in fuel temperature can be generated by using a cooler that cools down the DME fuels in the first fuel passage and the first return passage.

According to the above embodiments, since the first fuel passage is shorter than the second fuel passage, the difference in passage length is generated. However, the first fuel passage may be set to be longer than the second fuel passage to provide the difference in passage length. Similarly, according to the above embodiments, since the fuel temperature in the first fuel passage is higher than the fuel temperature in the second fuel passage, the difference in fuel temperature is generated. However, the fuel temperature in the first fuel passage may be controlled to be higher than the fuel temperature in the second fuel passage to provide the difference in fuel temperature.

According to the above embodiments, a part of the second fuel passage and a part of the second return passage are located in the cylinder head. That is, the cylinder head 111 is also equivalent to the second low-pressure passage member and the second return passage member. However, the second fuel passage and the second return passage may be defined in other components of a main constitution system of the internal combustion engine such as a cylinder block so as to increase the temperature of the DME fuel. Alternatively, the temperatures of the DME fuels in the second fuel passage and the second return passage may be increased by a configuration where the sub low-pressure pipe is interposed between the main low-pressure pipe and the internal combustion engine and the sub return pipe is interposed between the main return pipe and the internal combustion engine.

According to the above embodiments, since the head loss is generated due to a change of passage shape such as a branching, a bending, an enlargement and a throttling, a smoothing of a water hammer pressure is executed. However, when a configuration where the passage shape is changed is cancelled, the peak pressure can be reduced in a case where the difference in fuel temperature or the difference in passage length is provided.

As the above description, embodiments where the present disclosure is applied to the fuel supply device that supplies the DME fuel to the diesel engine are described. However, the present disclosure is not limited to the diesel engine, and the present disclosure may be applied to a fuel supply device that supplies a fuel to other internal combustion engines or an external combustion engine. Further, the fuel supplied by the fuel supply device is not limited to the DME fuel, and the fuel may be a fuel including DME, a liquefied petroleum gas, a compressed natural gas, a light oil or a gasoline.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. A fuel supply device supplying a fuel stored in a fuel tank to an engine, comprising:
   a low-pressure pump configured to feed the fuel of the fuel tank;
   a high-pressure pump configured to compress the fuel discharged from the low-pressure pump and to feed to the engine;
   a first low-pressure passage member configured to define a first fuel passage from the low-pressure pump to the high-pressure pump; and
   a second low-pressure passage member configured to define a second fuel passage that is branched from the first fuel passage at a low-pressure junction portion and joins the first fuel passage at a low-pressure confluence portion, wherein
   the first fuel passage and the second fuel passage are different in at least one of (i) temperatures of the fuels that flow through the first fuel passage and the second fuel passage and (ii) passage lengths of the first fuel passage and the second fuel passage from the low-pressure junction portion to the low-pressure confluence portion; and
   the second low-pressure passage member includes a low-pressure temperature increasing portion configured to increase the temperature of the fuel flowing through the second fuel passage by a heat generated at the engine.

2. The fuel supply device according to claim 1, wherein when a region of the first fuel passage interposed between the high-pressure pump and the low-pressure junction portion is expressed as a pre-branching region and a region of the first fuel passage interposed between the low-pressure junction portion and the low-pressure confluence portion is expressed as a post-branching region, and
   the pre-branching region has a flow passage area is smaller than a sum of a flow passage area of the post-branching region and a flow passage area of the second fuel passage that is branched at the low-pressure junction portion.

3. The fuel supply device according to claim 2, wherein the flow passage area of the post-branching region and the flow passage area of the second fuel passage are larger than or equal to the flow passage area of the pre-branching region.

4. The fuel supply device according to claim 1, wherein at least a part of the second fuel passage is defined by a fuel gallery located in a cylinder head of the engine.

5. The fuel supply device according to claim 1, further comprising:
   a first return passage member configured to define a first return passage that returns the fuel from the high-pressure pump toward the fuel tank; and
   a second return passage member configured to define a second return passage that is branched from the first return passage at a return junction portion and joins the first return passage at a return confluence portion, wherein
   the first return passage and the second return passage are different in at least one of (i) temperatures of the fuels that flow through the first return passage and the second return passage and (ii) passage lengths of the first return passage and the second return passage from the return junction portion to the return confluence portion.

6. A fuel supply device supplying a fuel stored in a fuel tank to an engine, comprising:
   a high-pressure pump configured to compress the fuel fed from the fuel tank by a low-pressure pump;
   a first return passage member configured to define a first return passage that returns the fuel from the high-pressure pump toward the fuel tank; and
   a second return passage member configured to define a second return passage that is branched from the first return passage at a return junction portion and joins the first return passage at a return confluence portion, wherein:
   the first return passage and the second return passage are different in at least one of (i) temperatures of the fuels that flow through the first return passage and the second return passage and (ii) passage lengths of the first return passage and the second return passage from the return junction portion to the return confluence portion; and
   the second return passage member includes a return temperature increasing portion configured to increase the temperature of the fuel flowing through the second return passage by a heat generated at the engine.

7. The fuel supply device according to claim 5, wherein the second return passage member includes a return temperature increasing portion configured to increase the temperature of the fuel flowing through the second return passage by a heat generated at the engine.

8. The fuel supply device according to claim 1, wherein the low-pressure pump feeds the fuel including a liquefied dimethyl ether toward the high-pressure pump.

9. The fuel supply device according to claim 6, wherein the low-pressure pump feeds the fuel including a liquefied dimethyl ether toward the high-pressure pump.

10. The fuel supply device according to claim 1, wherein the low-pressure temperature increasing portion is located in a cylinder head of the engine.

11. The fuel supply device according to claim 6, wherein the return temperature increasing portion is located in a cylinder head of the engine.

* * * * *